though the roll rate without restricting any normal tactical use of

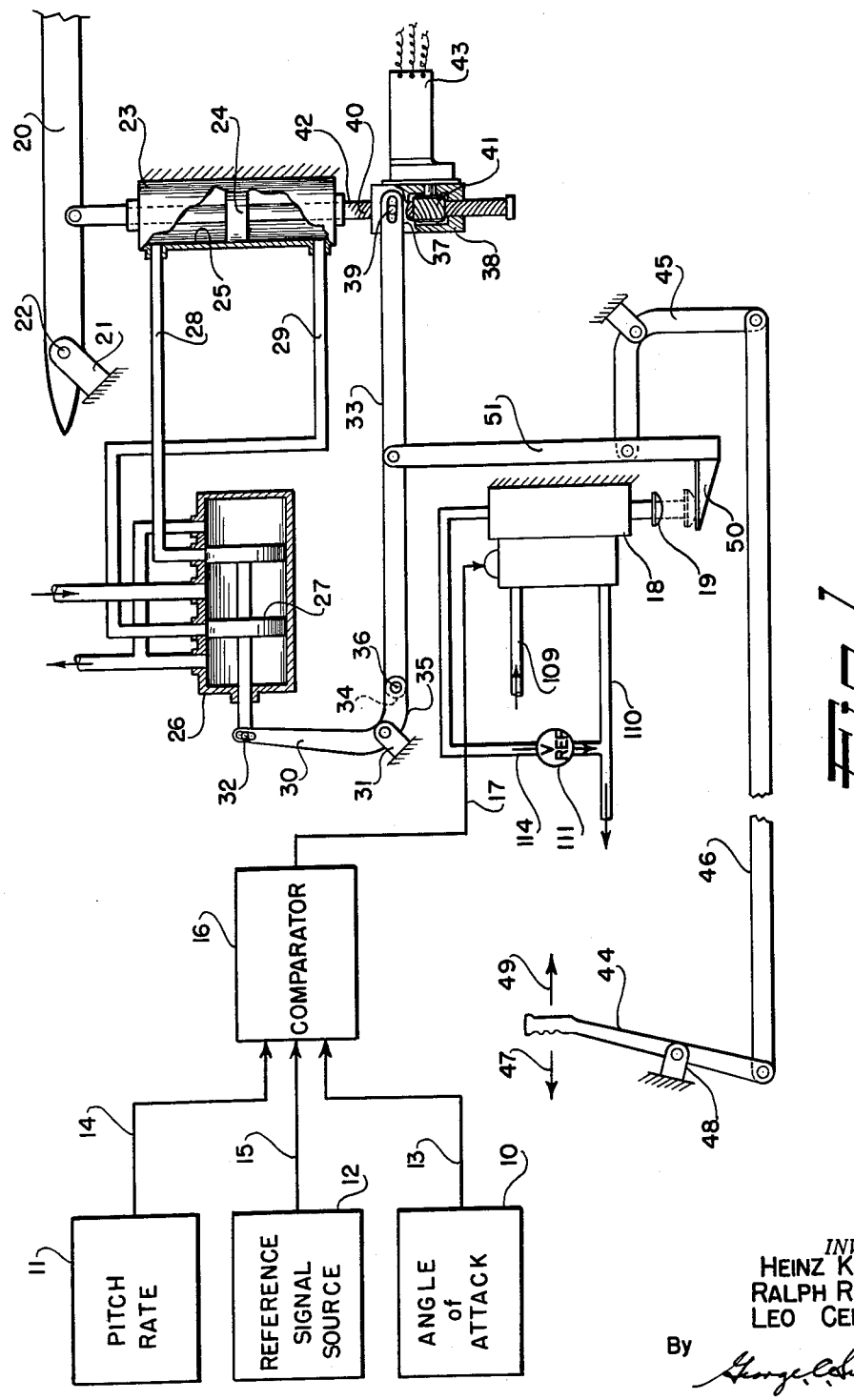

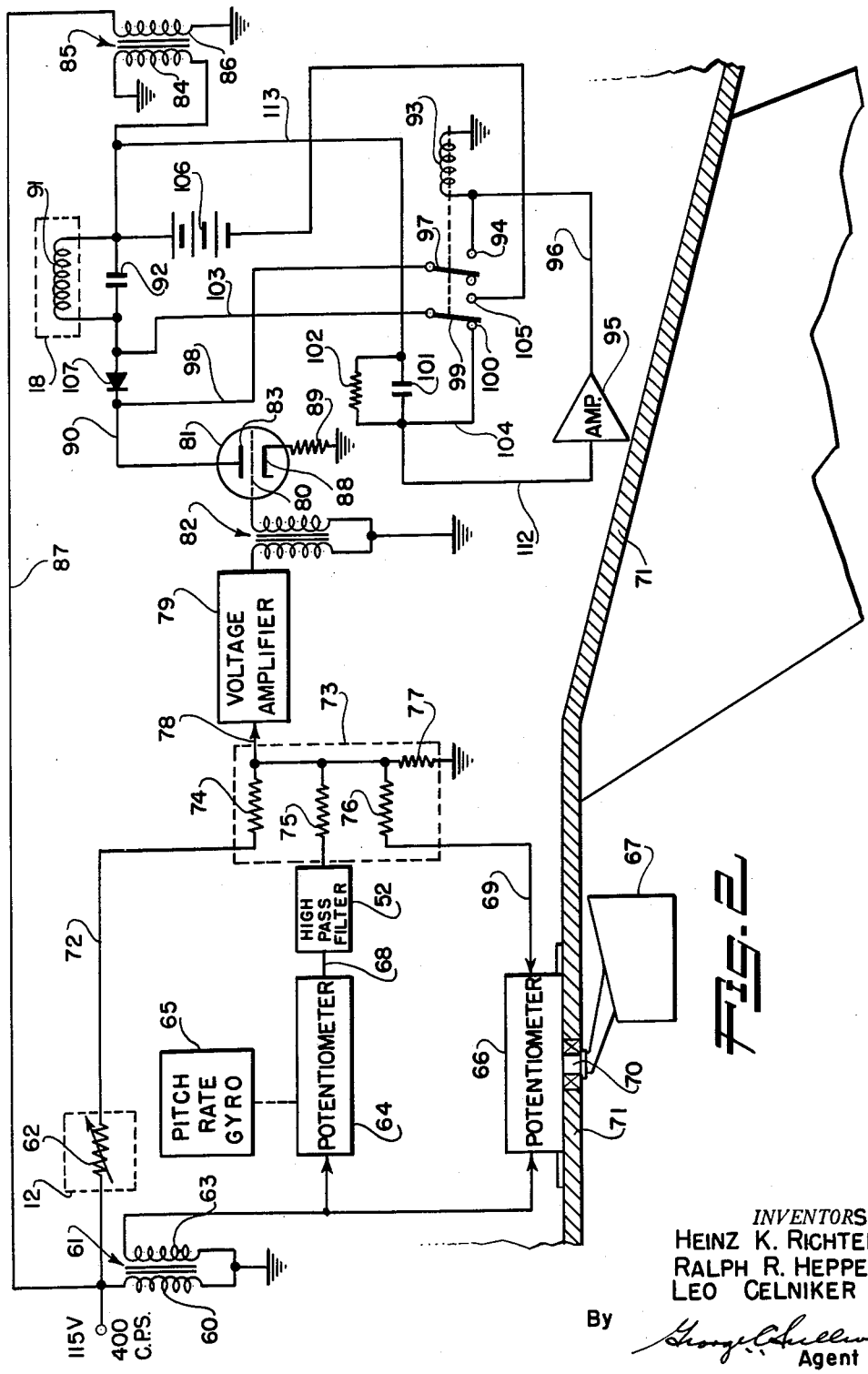

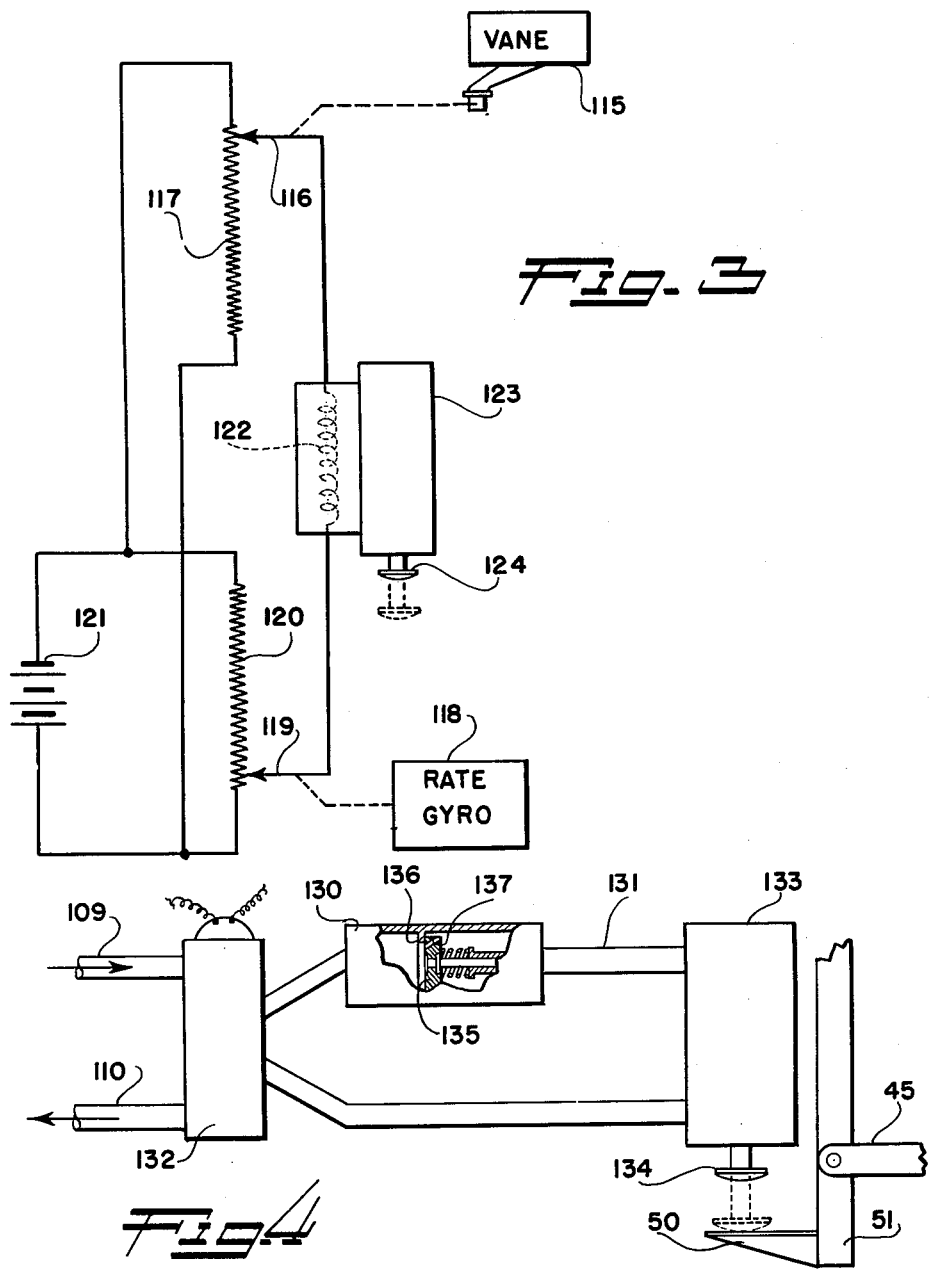

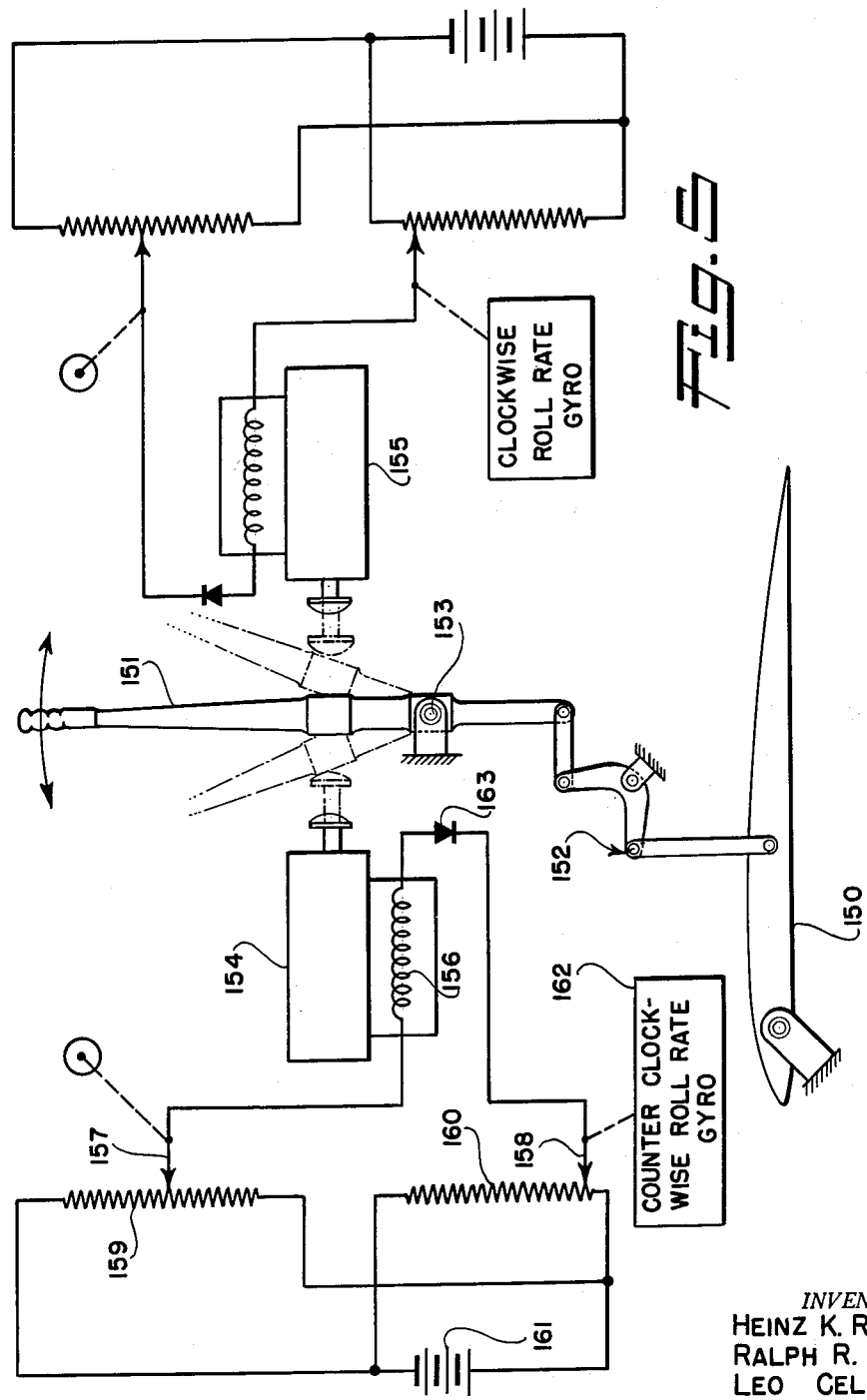

United States Patent Office 2,985,410
Patented May 23, 1961

2,985,410

AUTOMATIC STABILITY CONTROL DEVICE FOR AIRCRAFT

Heinz K. Richter, Los Angeles, Ralph R. Heppe, La Canada, and Leo Celniker, Canoga Park, Calif., assignors to Lockheed Aircraft Corporation, Burbank, Calif.

Filed Mar. 27, 1957, Ser. No. 648,960

9 Claims. (Cl. 244—77)

This invention relates generally to aircraft control systems and more particularly to an automatic stability control device to protect against the undesirable characteristics inherent in fully developed stalls and excessive roll rates of high speed aircraft.

Aircraft having a configuration most suitable for supersonic flight are subject to deterioration of the significant aerodynamic stability and control parameters at high angles of attack and high roll rates producing undesirable motions which may become uncontrollable and of a magnitude capable of destroying the aircraft. For example, at high angles of attack where longitudinal stability is lost in a stall, violent and uncontrollable pitch-up motions are produced. Similarly, at high roll rates, rapid deterioration of both the longitudinal and lateral stability and control parameters is experienced due to gyroscopic forces producing accelerated rolling and pitching moments. This instability resulting in a loss of control can be extremely dangerous, making it desirable if not necessary to prevent fully developed stalls and excessive roll rates from occurring.

A primary object of this invention is to provide an automatic stability control device which will prevent excessive roll rates or the inadvertent entry into a fully developed stall under all possible flight conditions including all possible combinations of speed, altitude, airplane attitude, center of gravity position, airplane weight, airplane configuration, i.e. flaps up or down, and with or without external stores.

Another object of this invention is to provide an automatic stability control device exhibiting positive, immediate and adequate control action to produce an airplane nose-down moment at the entry to the unstable stall condition without restricting any normal tactical use of the airplane.

Another object of this invention is to provide an automatic stability control device for aircraft which is responsive to a predetermined maximum roll rate for exerting a force on the control system in a direction to decrease the roll rate without restricting any normal tactical use of the airplane.

Another object of this invention is to provide an automatic stability control device which is dependable in operation and suitable for packaging as a small, lightweight unit.

Another object of this invention is to provide an automatic stability control device which may be readily incorporated into any aircraft control system.

Another object of this invention is to provide an automatic stability control device which is automatically operable during flight without requiring pilot action.

Still another object of this invention is to provide an automatic stability control device having fail-safe and override features wherein manual operation of the associated control system can be effected at any time.

Further and other objects will become apparent from a reading of the following description especially when considered in combination with the accompanying drawing wherein like numerals refer to like parts.

In the drawing:

Figure 1 is a schematic block diagram of a typical pitch control system incorporating the automatic stability control device;

Figure 2 is a circuit schematic of the automatic stability control device;

Figure 3 is a circuit schematic showing a modified form of the automatic stability control device;

Figure 4 is a view showing a modification of the electrohydraulic actuator which forms a part of the automatic stability control device; and Figure 5 is a view showing the automatic stability control device employed in a roll control system.

As applied to a pitch control system, the automatic stability control device exerts a force on the airplane steering mechanism such as the elevator or stabilizer actuating linkage when the entry to a fully developed stall is anticipated, urging the interconnected actuating linkage and stabilizer to move in a direction producing an airplane nose-down moment. As shown in Figure 1 this may be accomplished through the use of angle of attack measuring means 10 and pitch rate measuring means 11 together with a reference signal source 12 providing a reference bias signal establishing a threshold value representing the stall entry condition.

The outputs 13, 14 and 15 from angle of attack measuring means 10, pitch rate measuring means 11 and reference signal source 12 are applied to a comparator 16 which provides an output 17 for energizing an electrohydraulic automatic pitch control actuator 18 when the sum of the outputs from the angle of attack measuring means and pitch rate measuring means exceeds the output from reference signal source 12. Energizing of the automatic pitch control actuator 18 effects movement of actuator piston 19 to an extended position as indicated by dotted lines in Figure 1. This movement of actuator piston 19 supplies the force on the stabilizer control system actuating linkage urging stabilizer and control lever movement to a position producing an airplane nose-down moment.

A typical stabilizer control system is shown in Figure 1 together with the automatic stability control device of this invention to illustrate by way of a specific example the manner in which the automatic stability control device is to be used. Stabilizer 20 is swingably carried by aircraft structure 21 through a suitable hinge pin 22. Swinging movement of stabilizer 20 relative to the aircraft longitudinal axis is controlled by hydraulic actuator 23 fixed to the aircraft. Piston 24, forming a part of actuator 23, is positioned within the hydraulic actuator cylinder 25 by means of fluid pressure supplied through a hydraulic servo valve 26. By moving servo valve piston 27 to the right as viewed in Figure 1, fluid under pressure is caused to flow into actuator cylinder 23 through line 28 effecting movement of the stabilizer in a clockwise direction increasing the angle of attack to produce an airplane nose-down pitching moment. By moving servo-valve piston 27 to the left as viewed in Figure 1 fluid under pressure is caused to flow through line 29 and effect movement of piston 24 in the opposite direction, decreasing the stabilizer angle of attack and producing an airplane nose-up pitching moment.

A bell crank 30 pivotally carried by aircraft structure 31 connects at one end 32 with servo-valve piston 27 so that movement of the bell crank in a clockwise direction as viewed in Figure 1 will cause the servo-valve piston to move to the right and counterclockwise movement will cause the servo-valve piston to move to the left. The control linkage effecting movement of bell crank 30 comprises a lever 33 pivotally connected at one end 34 to the free arm 35 of bell crank 30 through pin 36. The opposite end 37 of lever 33 is swingably carried on a floating housing 38 through pin 39. Floating housing 38 carries a worm gear 41 which engages pinion gear teeth 40 formed on rod 42. Rod 42 is integral with piston 24 and extends axially through hydraulic actuator cylinder 25. A reversible motor 43 carried on floating housing 38 for driving the worm gear is used for trimming the airplane by varying the distance between lever 33 and piston 24.

A lever 51 is pivotally secured at one end to lever 33 intermediate of its ends 34 and 37 so that axial movement of lever 51 will effect swinging movement of lever 33 about pin 39 for rotating bell crank 30 and actuating servo-valve 26. Lever 51 is mechanically coupled to the pilot's control stick or lever 44 through a bell crank 45 and lever 46 so that a force supplied to control lever 44 causing movement in the direction of arrow 47 about its fulcrum 48 will produce an airplane nose-down moment and a force applied to the control lever causing movement thereof in the direction of arrow 49 will produce an airplane nose-up pitching moment.

The feedback obtained by attaching lever 33 to floating housing 38 on piston rod 42 of the stabilizer actuator will cause the stabilizer to follow the control lever. Through the operation of trim motor 43 in changing the distance between piston 24 and pin 39 the stabilizer may be moved for establishing a trim position with the control lever 44 remaining in the neutral position. Thus it is apparent that the position of lever 51 is determined by the position of control lever 44 and is independent of the trim setting. This is significant in the particular control system shown in Figure 1 since it allows the automatic pitch control actuator to always return the stabilizer to an angle of attack setting fixed with respect to the trim position in a rather simple manner. A detent 50 on lever 51 projects outwardly for engaging automatic pitch control actuator piston 19 when the pitch control actuator is energized, causing lever 51 to move in a direction returning control stick 44 towards its neutral position and returning the stabilizer towards its trim position. The stroke of automatic pitch control actuator piston 19 should normally be such that stabilizer 20 is returned to within one or two degrees of the trim position although this is a matter of design.

While the automatic pitch control signal for energizing actuator 18 may be derived in a variety of ways a preferred form is schematically illustrated in Figure 2. A source of electrical potential such as the 115 volt 400 cycle per second supply normally provided on an aircraft is applied to the primary winding 60 of a step-down transformer 61 and to a variable resistor 62, which together with the source of electrical potential, serves as the reference signal source 12 in Figure 1. The output of transformer 61 is obtained at the secondary winding 63 and applied to a potentiometer pick-off 64 from a pitch rate gyro 65 and to a potentiometer pick-off 66 from an angle of attack vane 67. The output of potentiometer 64 obtained through lead 68 is an alternating current the amplitude of which is proportional to airplane pitch rate. The airplane pitch rate signal may be used directly to represent the rate of change of angle of attack however for a closer approximation the output from potentiometer 64 may be fed through a high pass filter 52 which includes demodulating and remodulating means for attenuating the signal frequencies which are in the order of 0.1 cycle per second or less. The output of potentiometer 66 is an alternating current voltage obtained through lead 69 wherein the amplitude of the signal represents the angle of attack of vane 67.

Angle of attack vane 67 is supported by a shaft 70 extending through the aircraft fuselage wall 71. Rotation of the vane relative to the aircraft drives potentiometer 66 for converting the airplane angle of attack measurement into an electrical voltage. By properly locating the vane on the aircraft, close correlation between the vane angle of attack and the wing angle of attack may be obtained.

The signal representing angle of attack and rate of change of angle of attack, obtained through leads 69 and 68 respectively, are combined with the reference signal obtained through lead 72 from variable resistor 62 in a resistor summing network 73. The summing network is conventional, employing high impedance resistors 74, 75 and 76 together with a low impedance resistor 77 coupled to ground. The output of the summing network is obtained through lead 78. This output is an alternating current signal the amplitude of which represents the difference between the reference signal voltage and the sum of the voltages representing pitch rate and angle of attack. This voltage obtained at the output of summing network 73 results from the 180° phase shift obtained through transformer 61 for the pitch rate and angle of attack signals with respect to the phase of the reference signal. Lead 78 applies the summing network output to a voltage amplifier 79. The output of the voltage amplifier is applied to the grid 80 of an electron tube 81 through transformer 82 which shifts the phase of the voltage amplifier output approximately 180°. Cathode 88 of tube 81 is grounded through a biasing resistor 89. Plate 83 of electron tube 81 is connected to the secondary winding 84 of a transformer 85 through lead 90. The primary winding 86 of transformer 85 is coupled to the 115 volt 400 cycle per second supply source by lead 87 so that no phase shift will occur in the alternating current voltage from the supply source to plate 83.

So long as the reference signal from resistor 62 is greater than the sum of the pitch rate and angle of attack signals, the alternating current voltages applied at grid 80 and plate 83 of electron device 81 will be out of phase due to the phase shift in the grid voltage supplied through transformer 82. Thus when the voltage on grid 80 goes positive the voltage on plate 83 goes negative and when the grid goes negative the plate goes positive. This effectively holds the tube below cut-off preventing rectification of the alternating current signal at the plate.

When the sum of the pitch rate and angle of attack signals are greater than the reference signal, the grid voltage is substantially in phase with the plate voltage. This causes tube 81 to be cut off during the negative cycle of the plate signal and to conduct during the positive cycle, producing a substantial direct current voltage of positive polarity in plate lead 90.

Solenoid 91 of the electro-hydraulic automatic pitch control actuator 18 is coupled to plate lead 90 for actuation in response to the positive direct current voltage developed through tube 81. Upon energizing the solenoid, actuator piston 19 is caused to move to the extended position returning the control lever and stabilizer toward the trim position by engaging the control linkage as previously described in connection with Figure 1 and thereby prevent the occurrence of a fully developed stall.

An alternating current bypass around solenoid 91 is provided in output lead 90 by capacitor 92. When tube 81 is cut-off there is no current flow through solenoid 91, however when the tube conducts on the positive cycle of the plate voltage, a direct current potential is developed to energize the solenoid.

Electron tube 81 serves as a discriminator in the automatic pitch control circuit and is shown and described in some detail only as an example of a typical means for performing the function. It should be understood that equivalent devices for performing the same function may be incorporated into the circuit in lieu of the electron tube without departing from the teachings of the invention.

To prevent airplane oscillations from developing due to repeated actuation of the automatic stability control device at the threshold to a fully developed stall, a holding circuit may be employed as shown in Figure 2 for holding solenoid 91 energized for a pre-determined finite time interval even though the sum of the pitch rate and angle of attack signals may drop below the reference signal in less time than that established by the holding circuit. The holding circuit in the specific arrangement disclosed, utilizes a double throw, double pole relay having its coil 93 coupled at one end to ground. The opposite end of relay coil 93 is connected to a relay contact 94 and to the output of a direct current amplifier 95 through lead 96. Switch arm 97 associated with contact 94 is coupled to plate lead 90 through lead 98. Once the relay is energized switch arm 97 engages contact 94 to complete a circuit for holding the relay energized with the direct current voltage of positive polarity from tube 81.

In order to initially energize coil 93, switch arm 99 of the relay is coupled to plate lead 90 through a lead 103. When the relay is deenergized switch arm 99 engages contact 100, completing a circuit from the output of tube 81 to an energy storage network comprising capacitor 101 and resistor 102. Capacitor 101 and resistor 102 are connected in parallel at one end to plate lead 90 at secondary coil 84 of transformer 85 through lead 113 and at the opposite end to contact 100 and amplifier 95 through leads 104 and 112 respectively. When a direct current potential of positive polarity is developed through tube 81 the capacitor in the storage network becomes charged by the initial surge of energy. The charge on the capacitor causes relay coil 93 to become energized, uncoupling the storage network from the output of tube 81 and coupling the coil direct to plate 83 of the tube. Relay coil 93 is held energized for a minimum period of time as determined by the time constant of the storage network, and if the direct current signal of positive polarity continues to be generated at the output of tube 81 even after the storage network has lost its charge, the coil will remain energized until the direct current signal disappears.

A source of direct current potential such as a battery 106 is coupled between relay contact 105 and lead 90 at the positive side of solenoid coil 91 so that while relay coil 93 is energized, a positive voltage from the battery is applied to the solenoid coil for keeping the same energized even through no direct current energy is being developed through tube 81. Only by de-energizing relay coil 93 is solenoid coil 91 de-energized.

To isolate relay coil 93 from battery 106, a direct current blocking diode 107 is interposed in lead 90 between leads 98 and 103. Without the use of diode 107, current would be allowed to flow between the battery and ground through relay coil 93. Since the diode prevents current flow from battery 106 through coil 93, the coil remains energized only so long as a voltage is supplied by capacitor 101 or until the pitch rate and angle of attack signals drop below the pre-set boundaries established by the reference signal whichever is the longer.

While the automatic stability control device will function without the holding circuit, its use is most desirable since it prevents high frequency pitch oscillations from developing by actuation of the automatic stability control device at too high a repetition rate when the airplane is at the threshold to a fully developed stall.

The automatic stability control circuitry of Figure 2 provides an open loop system which is on or off depending upon the input signal relationship to a fixed reference voltage. This results in a positive acting system which is insensitive to small maladjustments permitting dependable use of the device to prevent longitudinal instability of the aircraft without affecting performance or maneuverability under all safe flight conditions.

A feature permitting the pilot to override the automatic stability control device is shown in Figure 1 wherein a fluid line 114 to the high pressure side of electro-hydraulic actuator 18 is coupled to the output line 110 from the actuator through a pressure relief valve 111. By exerting a force on the control stick 44 sufficient to open pressure relief valve 111, the fluid is permitted to escape the electro-hydraulic actuator 18 and return to the hydraulic supply through output line 110, allowing piston 19 to be retracted. This is an optional feature which may be desirable for emergency use however the force exerted by the electro-hydraulic actuator on the control linkage should be adequate to provide an unmistakable warning to the pilot and automatically produce a nose-down airplane pitching moment which can be overridden only by positive and substantial exertion on the part of the pilot.

In operation, the pitch control version of the automatic stability control device measures pitch rate and angle of attack of the aircraft and compares the sum of these quantities with a reference quantity. The reference quantity represents the boundary at which the airplane will enter a fully-developed stall condition in which the airplane becomes longitudinally unstable with the control being ineffective to return the airplane to a normal flight attitude. When the sum of the pitch rate and angle of attack measurements exceeds the reference level, a force is applied to the control system urging the pilot's control stick forward and repositioning the stabilizer to produce a nose-down airplane pitching moment, decreasing the angle of attack. The amount of movement of the stabilizer and stick by the automatic pitch control device may be controlled by limiting the stroke of the electro-hydraulic valve piston. As previously mentioned, this movement should return the stabilizer to a position in the neighborhood of one or two degrees ahead of the trim position, however this is largely a matter of choice in designing the system for a particular airplane.

The reason for employing the pitch rate signal is to provide a certain amount of anticipation in the system. If the airplane is approaching a fully-developed stall rapidly, the actuator must respond at a lower angle of attack than if the fully-developed stall is being approached more slowly since the response time for the stabilizer to return the aircraft to a safe attitude will be longer. Hence pitch rate information is important in providing automatic pitch control under all entry conditions to an accelerated or unaccelerated stall. It should be recognized however that the pitch rate information may be omitted as an input to the automatic pitch control device without departing from the teachings of the invention. It should be further recognized that equivalent sensing devices may be employed to sense the approach to the stall condition for controlling the automatic pitch control actuator.

To illustrate a typical modification of the automatic stability control device, reference is made to Figure 3. An angle of attack vane 115 drives the pickoff arm 116 on a potentiometer 117 and a rate gyro 118 drives the pickoff arm 119 on a potentiometer 120. Potentiometers 117 and 120 are excited from a common source of direct current potential such as a battery 121 while the pickoff arms 116 and 119 are connected in series with the solenoid coil 122 of a polarity sensitive electro-hydraulic actuator 123. The pickoffs are positioned at opposite ends of their respective potentiometers for the zero input condition. As the sum of the pitch rate and angle of attack signals build up in a pitching maneuver, the bias voltage on solenoid coil 122 goes to zero and reverses sign. As this happens, the solenoid coil is energized causing actuator piston 124 to move to its extended position and remain there until the coil is again de-energized. By incorporating actuator 123 into the airplane steering system in the manner shown for actuator 18 in Figure 1, the device will operate in accordance with the teachings of this invention to prevent inadvertent entry into a fully-developed stall.

The function of holding the automatic pitch control actuator in the extended position for a predetermined minimum time may be accomplished by means other than the holding circuit shown in Figure 2. As shown in Figure 4, for example, a differential flow valve 130 may be interposed in the fluid line 131 between solenoid control valve 132 and actuating cylinder 133. To extend actuator piston 134 for engaging the stabilizer control linkage, high flow rates are permitted into cylinder 133, but when control valve 132 is de-energized for retraction of the piston, fluid flow is restricted. Thus piston 134 retracts slowly, avoiding high frequency oscillatory stabilizer movement.

A suitable differential flow valve is illustrated in Figure 4 wherein a movable piston 135 is spring urged to engage an annular flange 136 formed on the inner wall of the valve housing. Fluid pressure in one direction causes movement of piston 135 away from the flange, against the action of the spring allowing a high flow rate, while fluid pressure in the opposite direction forces the piston against the flange, limiting the flow of fluid through the valve to that permitted by an orifice 137 in the piston.

Figure 5 shows a version of the automatic stability control device employed for limiting airplane roll rate. Aileron 150 is operatively connected to the control lever 151 through a suitable actuating linkage 152. Movement of control lever 151 about its fulcrum 153 causes corresponding movement of the aileron for maneuvering the aircraft in roll. To avoid exceeding the maximum safe roll rate in either the clockwise or counterclockwise direction, two actuators 154 and 155 are employed to push the control lever in either direction. Each actuator is shown as being of the solenoid type wherein coil 156 is connected in series with pickoff arms 157 and 158 associated with potentiometers 159 and 160 respectively. The potentiometers are coupled in parallel to a suitable source of electrical potential such as battery 161. Pickoff arm 158 of potentiometer 160 is driven by a roll rate gyro 162 which is blocked to provide an output only in the clockwise roll direction in the circuitry associated with actuator 155 and in the counterclockwise direction in the circuitry associated with actuator 154. Pickoff 157 is positioned to establish a roll rate threshold at which a reversal of polarity occurs as a result of moving pickoff arm 158 relative to its zero input position at one end of the potentiometer. As the roll rate signal builds up in a maneuver, the bias voltage on coil 156 goes to zero and reverses sign. As this happens the actuator is energized, applying a force on control lever 151 urging it to move in a direction to reduce the roll rate.

Where actuators 154 and 155 are required to operate in response to a reversal of polarity as in Figure 5, they must be of the polarity sensitive type. A diode 163 may, for example, be introduced in the solenoid circuit for blocking current flow in one direction. Thus current flows through the solenoid only when signal is of the proper polarity.

The Figure 5 circuitry is similar to that shown in Figure 3, however, any or all of the basic features of Figures 1, 2 and 4 may also be used for limiting the roll rate of an aircraft without departing from the teachings of this invention.

While the automatic stability control device is described herein in connection with specific control linkages and servo-drive mechanisms it is for purposes of illustration rather than limitation. The device may obviously be used to maintain any of the airplane stability and control parameters within a safe operating range.

It should be understood that many alterations, modifications and substitutions such as those suggested hereinabove may be made to the instant disclosure without departing from the spirit and scope of the invention as defined by the appended claims.

We claim:

1. An automatic stability control device for aircraft having a manual control lever and a movable airfoil operatively coupled to the control lever for guiding the aircraft comprising, a source of alternating current, means connecting with said source of alternating current and providing a threshold reference signal, an angle of attack sensing vane externally carried on the aircraft, means coupled to the source of alternating current and operatively connecting with said vane to provide an output signal proportional to angle of attack, rate sensing means coupled to said source of alternating current and providing an output signal representing the rate of change of angle of attack, means detecting the difference between said threshold reference signal and the sum of said output signals and providing an output control signal only so long as the sum of the output signals exceed the reference signal, and an actuator responsive to said output control signal for energization whereby a force is exerted on the control lever urging the same in a direction causing the movable airfoil to produce a nose-down moment decreasing the angle of attack.

2. A device as set forth in claim 1 wherein a holding means responsive to the control signal is provided maintaining the actuator energized a predetermined minimum time interval.

3. An automatic stability control device for aircraft having a main sustaining wing and an auxiliary movable member controlling the angle of attack of the wing comprising, means providing a threshold reference signal, means detecting angle of attack and providing an output proportional thereto, means detecting the rate of change of angle of attack and providing an output proportional thereto, comparator means combining the outputs from the last three mentioned means and providing an output representing the difference between the threshold reference signal and the sum of the outputs from the last two mentioned means, and an actuator responsive to the output from the comparator means for energization whereby a force is exerted urging said movable member in a direction to reduce the angle of attack only when the sum of the outputs from said last two mentioned means exceeds a predetermined threshold signal level.

4. A device as set forth in claim 3 including holding the actuator energized for a predetermined minimum time interval.

5. An automatic stability control device for aircraft having a manual control lever and a movable airfoil operatively coupled to the control lever for guiding the aircraft comprising, a source of electrical potential, an angle of attack sensing vane externally carried on the aircraft, means coupled to said source of electrical potential and operatively connecting with said vane to provide an output voltage proportional to angle of attack, rate means coupled to said source of electrical potential and providing an output voltage representing the rate of change of angle of attack, means combining the output voltages, and actuator means responsive to a predetermined magnitude of the combined output voltages for exerting a force on the control lever urging the same to move in a direction causing the movable airfoil to produce an aircraft nose-down moment.

6. An automatic stability control device for airplanes comprising, a source of electrical potential, means connecting with said source of electrical potential and providing an output voltage representing airplane angle of attack, means connecting with said source of electrical potential and providing an output voltage representing rate of change of airplane angle of attack, means connecting with said source of electrical potential and providing a reference voltage, comparator means responsive to the difference between said reference voltage and the sum of said output voltages to provide a control voltage in response to the magnitude of said output voltages exceeding said reference voltage, and actuator means operative in response to said control voltage for exerting a nose-down pitching moment on the airplane.

7. An automatic stability control device for airplanes having steering means comprising, a source of electrical potential, means connecting with said source of electrical potential and providing an output voltage representing airplane angle of attack, means connecting with said source of electrical potential and providing an output voltage representing the rate of change of angle of attack, means providing a reference voltage representing the threshold to a fully-developed stall, summing means responsive to the difference between said reference voltage and the sum of the output voltages to provide a signal representing the difference between the output voltages and said reference voltage, discriminator means responsive to said signal and providing a control output when the magnitude of the output voltages exceed said reference signal, and actuator means connecting with said discriminator means and urging said steering means in a direction to exert a nose-down pitching moment on the airplane in response to said control output.

8. A device as set forth in claim 7 including, means limiting the operation of the actuator means to exert a nose-down pitching moment on the airplane a predetermined minimum time interval.

9. A device as set forth in claim 7 including, a relay, energy storage means responsive to the control output from said discriminator means for holding said relay energized a predetermined minimum time interval, and a secondary control output coupled by said relay to the actuator means for holding the same energized only when the relay is energized.

References Cited in the file of this patent

UNITED STATES PATENTS

| | | |
|---|---|---|
| 2,584,298 | Seay | Feb. 5, 1952 |
| 2,630,284 | Feeney | Mar. 3, 1953 |
| 2,701,111 | Schuck | Feb. 1, 1955 |
| 2,761,998 | Chen | Sept. 4, 1956 |
| 2,767,942 | Lucien | Oct. 23, 1956 |
| 2,768,343 | Kutzler | Oct. 23, 1956 |
| 2,838,255 | Hagopian et al. | June 10, 1958 |
| 2,922,086 | Stidger | Jan. 19, 1960 |